(12) United States Patent
Jacobowitz et al.

(10) Patent No.: US 7,917,799 B2
(45) Date of Patent: Mar. 29, 2011

(54) METHOD AND SYSTEM FOR DIGITAL FREQUENCY CLOCKING IN PROCESSOR CORES

(75) Inventors: Lawrence Jacobowitz, Wappingers Falls, NY (US); Mark B. Ritter, Sherman, CT (US); Daniel J. Stigliani, Jr., Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 916 days.

(21) Appl. No.: 11/734,375

(22) Filed: Apr. 12, 2007

(65) Prior Publication Data

US 2008/0256382 A1 Oct. 16, 2008

(51) Int. Cl.
*G06F 1/04* (2006.01)
*G06F 1/12* (2006.01)
*G06F 1/00* (2006.01)
*H03L 7/099* (2006.01)

(52) U.S. Cl. ........ 713/600; 713/375; 713/500; 713/501; 331/177 R (58) Field of Classification Search .......... 713/375, 713/500, 501, 600; 331/177
See application file for complete search history.

(56) References Cited

U.S. PATENT DOCUMENTS

| | | | | |
|---|---|---|---|---|
| 5,481,573 A * | 1/1996 | Jacobowitz et al. | ....... | 375/356 |
| 6,484,041 B1 * | 11/2002 | Aho et al. | ....... | 455/574 |
| 6,750,693 B1 | 6/2004 | Duewer | | |
| 6,889,331 B2 * | 5/2005 | Soerensen et al. | ....... | 713/320 |
| 6,944,780 B1 * | 9/2005 | Kranzen et al. | ....... | 713/300 |
| 6,963,992 B1 * | 11/2005 | Cheng et al. | ....... | 713/501 |
| 7,124,315 B2 * | 10/2006 | Espinoza-Ibarra et al. | ... | 713/501 |
| 7,188,261 B1 * | 3/2007 | Tobias et al. | ....... | 713/300 |
| 7,263,457 B2 * | 8/2007 | White et al. | ....... | 702/132 |
| 7,310,022 B2 * | 12/2007 | Doi | ....... | 331/34 |
| 7,350,096 B2 * | 3/2008 | Boerstler et al. | ....... | 713/501 |
| 7,478,259 B2 * | 1/2009 | Ferraiolo et al. | ....... | 713/501 |
| 7,501,865 B1 * | 3/2009 | Jacobowitz et al. | ....... | 327/147 |
| 2001/0029590 A1 * | 10/2001 | Sager et al. | ....... | 713/501 |
| 2002/0169990 A1 | 11/2002 | Sherburne, Jr. | | |
| 2002/0184546 A1 | 12/2002 | Sherburne, Jr | | |
| 2003/0014682 A1 | 1/2003 | Schmidt | | |
| 2003/0120963 A1 | 6/2003 | Jahnke | | |
| 2004/0139362 A1 * | 7/2004 | Inaba | ....... | 713/322 |
| 2005/0076258 A1 * | 4/2005 | Cheung et al. | ....... | 713/322 |
| 2005/0166073 A1 | 7/2005 | Lee | | |
| 2006/0030277 A1 | 2/2006 | Cyr et al. | | |
| 2006/0133559 A1 * | 6/2006 | Glass | ....... | 375/376 |
| 2006/0238227 A1 | 10/2006 | Kim et al. | | |
| 2006/0282692 A1 * | 12/2006 | Oh | ....... | 713/300 |
| 2007/0064852 A1 * | 3/2007 | Jones et al. | ....... | 375/356 |
| 2008/0256381 A1 * | 10/2008 | Jacobowitz et al. | ....... | 713/501 |
| 2009/0106576 A1 * | 4/2009 | Jacobowitz et al. | ....... | 713/501 |

* cited by examiner

*Primary Examiner* — Ji H Bae
(74) *Attorney, Agent, or Firm* — Scully, Scott, Murphy & Presser, P.C.; Louis J. Percello, Esq.

(57) ABSTRACT

Disclosed are a method of and system for digital frequency clocking in a processor core. At least one-processor core is provided, and that processor core has a clocking subsystem for generating an output clock signal, which may be an analog signal at a variable frequency. Digital frequency control data are transmitted or distributed to the processor core; and that one processor core receives the digital frequency control data transmitted to the core, and uses that received digital frequency control data to set the frequency of the output clock signal of the clocking subsystem of the processor core. Preferably, multiple cores are asynchronously clocked and the core frequencies are independently set, and, there is no phase relationship between the core clocks.

22 Claims, 5 Drawing Sheets

METHOD AND SYSTEM FOR DIGITAL FREQUENCY CLOCKING IN PROCESSOR CORES

CROSS REFERENCE TO RELATED APPLICATION

This application is related to copending application Ser. No. 11/734,334, for "Method and System for Analog Frequency clocking in Processor Cores," filed herewith, the disclosure of which is herein incorporated by reference in its entirety.

BACKGROUND OF THE INVENTION

1. Field of the Invention

This invention generally relates to multicore processing systems, and more specifically, to digital frequency clocking in multicore processor systems. Even more specifically, in the preferred embodiment, the invention relates to digital multi-frequency clocking in multi-chip/multi-core processors.

2. Background Art

Servers are beginning to exploit a multiplicity of multi-core processor chips in order to continue to increase performance, as processor frequency scaling can no longer meet the industry growth in performance. Also, the increasing difficulty and hardware cost, as well as signal integrity concerns, associated with the transmission of high frequency clocking throughout a multi-chip and multi-core processor server make high frequency clocking an untenable long-term strategy for future server systems. The state of the art for clock distribution is based on analog signals using transmission lines. This technique is limited in scalability due to skin effect, media and connector loss, crosstalk, termination mismatches, etc. Today's large servers contain, for example, greater than 10 processor chips typically containing two cores per chip. It is expected both chips and cores per chip will increase in future servers. Transmission of high frequency clocks (>5-10 GHz) for multiple chips, with multiple cores per chip, server systems are not feasible with known carriers for electronic packages and electrical connectors. The need to operate this configuration in a tightly coupled mode as a Symmetric Multi-processor (SMP) will require a new clocking paradigm.

In view of the above, a novel approach is needed to provide processor clocking in future generations of multiple multi-core processor chip servers and computing platforms.

SUMMARY OF THE INVENTION

An object of this invention is to provide a method of and system for processor clocking in multiple multi-core processor chip servers and computing platforms.

Another object of the present invention is to provide digital multi-frequency clocking in multi-chip/multi-core per chip processors.

A further object of the invention is to achieve clock distribution to a multitude of processor cores with a digital signal and a distribution network and including a digitally controlled local high-speed oscillator as part of each processor core.

These and other objectives are attained with a method of and system for digital frequency clocking in a processor core. At least one processor core is provided, and that at least one processor core has a clocking subsystem for generating an output clock signal at a variable frequency. Digital frequency control data are transmitted to that at least one processor core; and that at least one processor core receives the digital frequency control data transmitted to said core, and uses that received digital frequency control data to set the frequency of the output clock signal of the clocking subsystem of the processor core.

In a preferred implementation, multiple cores are asynchronously clocked and the core frequencies are independently set, and there is no phase relationship between the core clocks.

Also, in a preferred embodiment, a plurality of processor cores are provided, and each of the processor cores has a respective clocking subsystem for generating an output clock signal at a variable frequency. In this preferred embodiment, individual digital frequency control data are transmitted to each processor core; and each processor core receives the digital frequency control data transmitted to the core, and uses that received digital frequency control data to set the frequency of the output clock signal of the clocking subsystem of the processor core.

Preferably, each processor core includes a voltage controlled oscillator to generate the output clock signal, and the digital frequency control data transmitted to the processor core is used on that core to control the voltage controlled oscillator of the core to generate the output clock signal at the set frequency. Also, preferably, each of the processor cores further includes a digital signal processor that receives and stores the digital frequency control data transmitted to the respective core.

The preferred embodiment of the invention provides a computing system clocking subsystem solution with a single system reference oscillator, which may be spread (for spread-spectrum) to satisfy EMI requirements. The invention achieves clock distribution to each core with a digital signal and a distribution network and including a "digitally controlled local high frequency oscillator" (generally on the range of 1 or more GHz) as part of the core. The local core oscillator frequency is determined by the digital control data that can be used to set the core frequency of operation using digital signal processing or other digital means. The frequency can be established based upon an operating policy for the core set by the server manufacturer or customer. Generally, this operation policy establishes the objective for the core as a trade-off between processing speed versus power dissipation. At different voltages, the maximum capability of the core may be obtained at different clocking frequencies, and the operating policy set for the core may identify the desired clocking frequencies at different voltages.

Respective frequency control information is sent to each core as a moderate speed (10-100 Mb/s) digital data thereby avoiding the problems with high-speed analog signal transmission. As digital data, the control signal has high noise immunity and low signal distortion. The frequency control information is sent as individual control data (n data) to each core. The data is latched into the core "digitally controlled oscillator" from the server vital chip data (VCD) within the server serially electrically erasable programmable read only memory (SEEPROM). No further transmission of individual control data (n data) is required until the core frequency needs to be adjusted for an environmental change.

The single reference oscillator is set at a moderate frequency (10-100 MHz), which is distributed to each core such as via analog transmission line techniques and re-drive circuits. In general, a change in the fundamental core operating frequency is not required (or infrequently required) such that a low speed reference is sufficient to provide a clock for the digital signal processing functions associated with the digitally controlled oscillator.

Each core is running asynchronous from each other and with respect to local cache. It will be appreciated that, once the different regions of a chip are asynchronous, some handshaking/buffering will be required to transfer data between regions, so there will be some added latency. There are techniques to minimize this latency. Nevertheless, the net performance gain of operating each core at its maximum frequency will be substantial such as in the range from 10 to 20%.

The preferred embodiment of the invention provides a number of important advantages. For example, this preferred embodiment enables multiple processor servers at little additional cost above today's technical approaches, maintaining clock signal integrity. Also, the preferred embodiment enables optimal frequency performance of each core independently, spread spectrum capability, and high total performance at a given power level. The invention also provides for future extendibility as more cores per chip and larger chips exacerbate the problem of optimizing the clock frequency of each core independently.

The present invention can be applied to any processing platform that uses multi-microprocessor core silicon chips, for example, client uP platforms, storage controllers, data communication switches, etc.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

The current and future generation of commercial servers is and will be composed of multiple processor chips with multiple uP cores, which enables server platforms with 2-64 processors today. Future systems will likely contain upwards of 128-256 processors and possibly higher. The need to operate this configuration in a tightly coupled mode as a Symmetric Multi-processor (SMP) will require a new clocking paradigm. The current technique of transmitting analog clocks to each processor is not practical for large configurations running at high processor speeds (>5 GHz).

Figure 1:
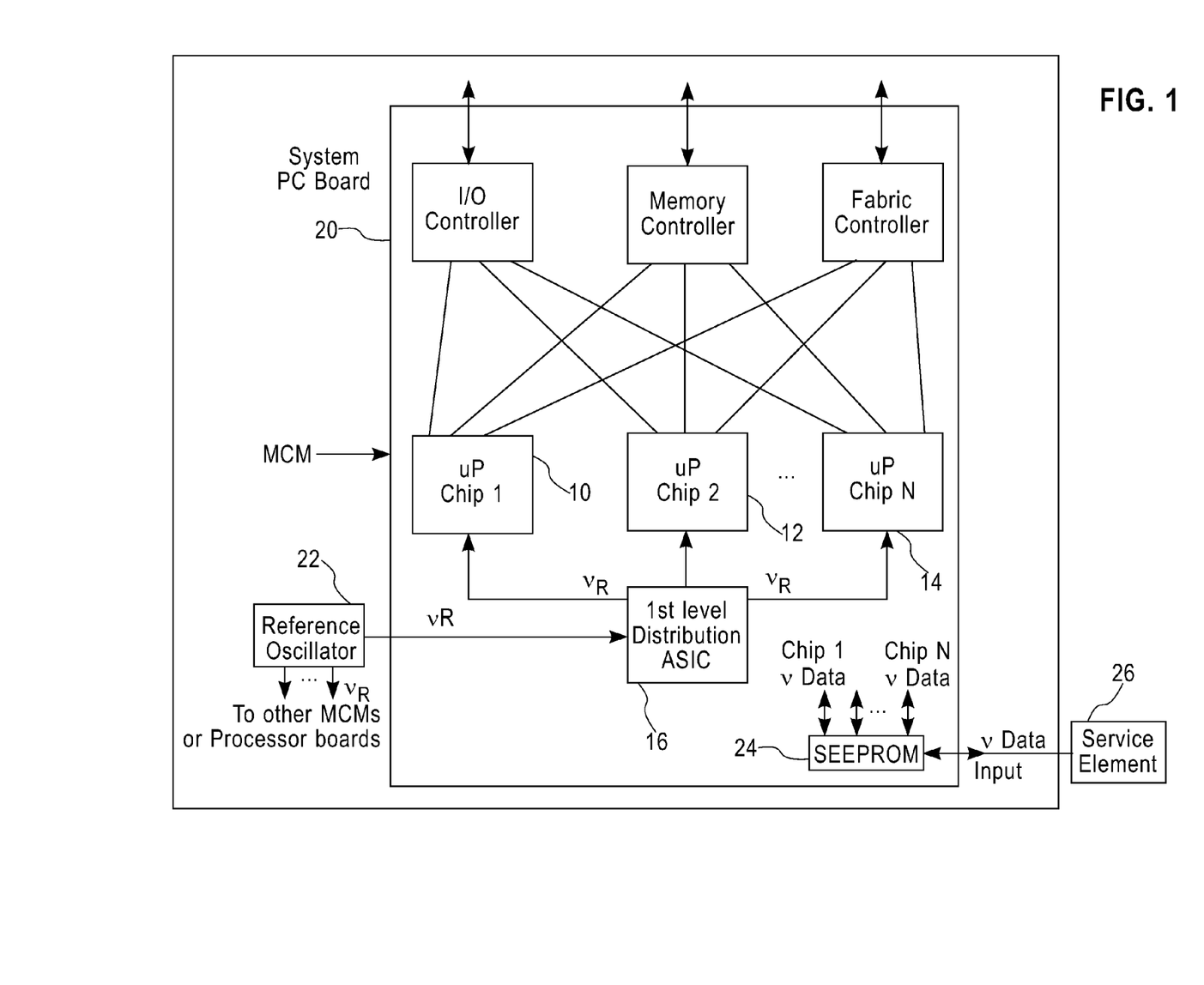
FIG. 1 illustrates a typical computing Server comprised of multiple microprocessor chips.

FIG. 1 illustrates a typical computing Server that is comprised of multiple microprocessor (uP) chips (N) 10, 12, 14, which has internal clocking functions (e.g. digital signal processor, DSP, core clock generator, etc.) that require the machine reference oscillator ($n_R$). A first level distribution ASIC (Application Specific Integrated Circuit) 16 on the MCM or system board 20 re-drives and fans out the reference clock signal to each uP chip in the Multi-chip Module MCM) or system board.

Typically the reference oscillator clock frequency ($n_R$) is a relatively low frequency (typically 10-100 MHz) such that it can be easily routed throughout the MCM or a PC board without significant signal degradation yet fast enough to insure clock synchronization updates sufficient to insure the uP high speed clock (typically 5-10 GHz) is stable and remains within the platform deviation requirement (typical 10-100 ppm, parts per million). The distribution is generally point-to-point (illustrated in FIG. 1) for best reference clock integrity but may be multi-drop for lower performance and lower cost configurations. The reference oscillator signal from reference oscillator 22 is used as the clock signal for the uP core integrated high frequency clock generator, as described below.

FIG. 1 also shows the interconnection from the uP chips to the I/O Subsystem, System Memory, and external System Clustering fabric via the appropriate controller interface. The Clustering fabric is used to interconnect multiple MCMs together to construct a larger multi-processor Server where the MCMs are connected in a symmetric multi-processing (SMP) configuration. In an SMP configuration, the memory is coherent to all the processors within the SMP. In this case all the MCMs are synchronized to a single Reference Oscillator (illustrated in FIG. 1 outside the MCM).

In an alternate embodiment, the method of this invention can also be used on a configuration of uP chips contained on multiple Single Chip Modules (SCM) mounted on a common glass epoxy printed circuit (PC) board. This alternate packaging configuration may be used for smaller systems. In this case, the Distribution ASIC is also mounted in an SCM on the system board and interconnection to each processor chip is done via system PC board wiring.

The MCM and/or PC board contains Vital Chip Data (VCD) in a chip, which is typically a Serial Electrically Erasable Programmable Read Only Memory (SEEPROM) 24. This chip contains the "n data" for each connected processor (core). The "n data" is the digital representation of the optimum processor (core) frequency along with identification (Id) of the appropriate chip and core. The Id information is used to insure the correct VCD is transmitted and stored in the VCD Interface function on each chip for all cores on the chip. The VCD is derived from the frequency characterization data, voltage characterization data, power characterization, etc. gathered by the Service Element (SE) 26. The SE analyzes and reformats the data and loads the data into the system SEEPROM via an appropriate digital interface (e.g. $I^2C$). The totality of data gathered and analyzed by the SE is used to set the optimum frequency, voltage, etc. for each core to achieve the highest performance possible or other policy established by the customer. In accordance with the present invention, this data is used to set the processor frequency, which is generated locally versus today's approach of transmitting an analog clock signal.

The data for each core/chip can be obtained, for example, during the chip test/verification stage in the manufacturing process or as part of a training paradigm during initial power on of the server. The latter approach may be part of the initialization and set-up process of the server. The data collection process for each processor (core) is typically implemented by the SE of the server and subsequently the "n data" is loaded into the SEEPROM.

Figure 2:
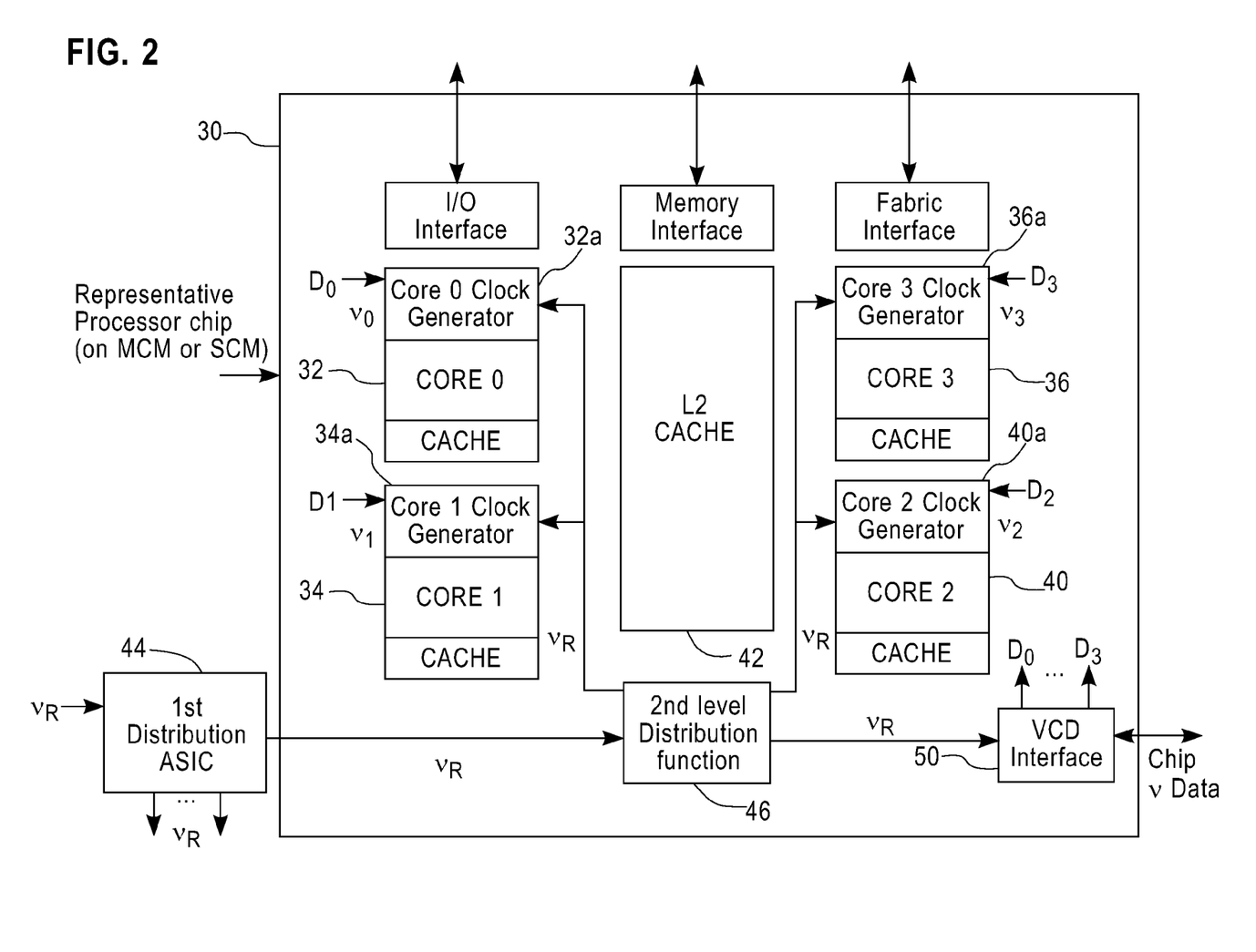
FIG. 2 shows a representative server processor chip configuration with multi cores and a shared L2 cache

FIG. 2 illustrates a representative server processor chip 30 (one of several for a typical machine configuration) with multi-cores (4 illustrated) 32, 34, 36, 40 and shared L2 cache 42. The four core clock generators 32a, 34a, 36a, 40a within processor chip 30 receive the reference clock from the first level distribution ASIC 44 by means of the second level distribution function 46, which is contained on the chip. The clock reference signal ($n_R$) is transmitted to each core using a multi-drop bus (illustrated) or a point-to-point star interconnection. The chip also contains the VCD interface function 50, which is connected to the SEEPROM (See FIG. 1) to receive the appropriate data for setting the frequency of each of the cores within the chip. The VCD Interface function contains the chip and core Ids (loaded by SE using chip or packaging serial number), interrogates the SEEPROM and obtains the appropriate data (typically through an I²C interface) for its' cores. It may contain some SRAM and state machines or small controller in addition to the I²C interface. It also performs the distribution function by transmitting the n Data intended for a particular core generator to that core generator only. As part of the n Data content, a chip and core Id is included. This core Id is used by the VCD Interface function to route the n Data to the appropriate port. For example, n Data intended for core "0" is routed to port "$D_0$" (FIG. 2). The n Data is stored in the digital clock generators 32a, 34a, 36a and 40a and is used as the respective processor clock frequency data until it is updated by the VCD Interface function. If no changes are forthcoming, no data is sent from the VCD Interface function or the SEEPROM. The n Data is not sent continuously but only when it is updated. This is in contrast to the state-of-the-art analog technique where the signal must be sent continuously.

Each core is comprised of the microprocessor, dedicated cache, and the core clock generator. The core frequency is set by the core clock generator based on the digital data in the VCD for each core. Each core is likely to have different frequency settings. The number of cores within the processor chip is determined by the technology and manufacturing process capability. Four are shown for illustrative purposes. The technical approach described herein easily scales with the number of cores, which will likely increase in the future. The chip also contains the appropriate interfaces to the I/O, Memory, and Fabric controllers.

Figure 3:
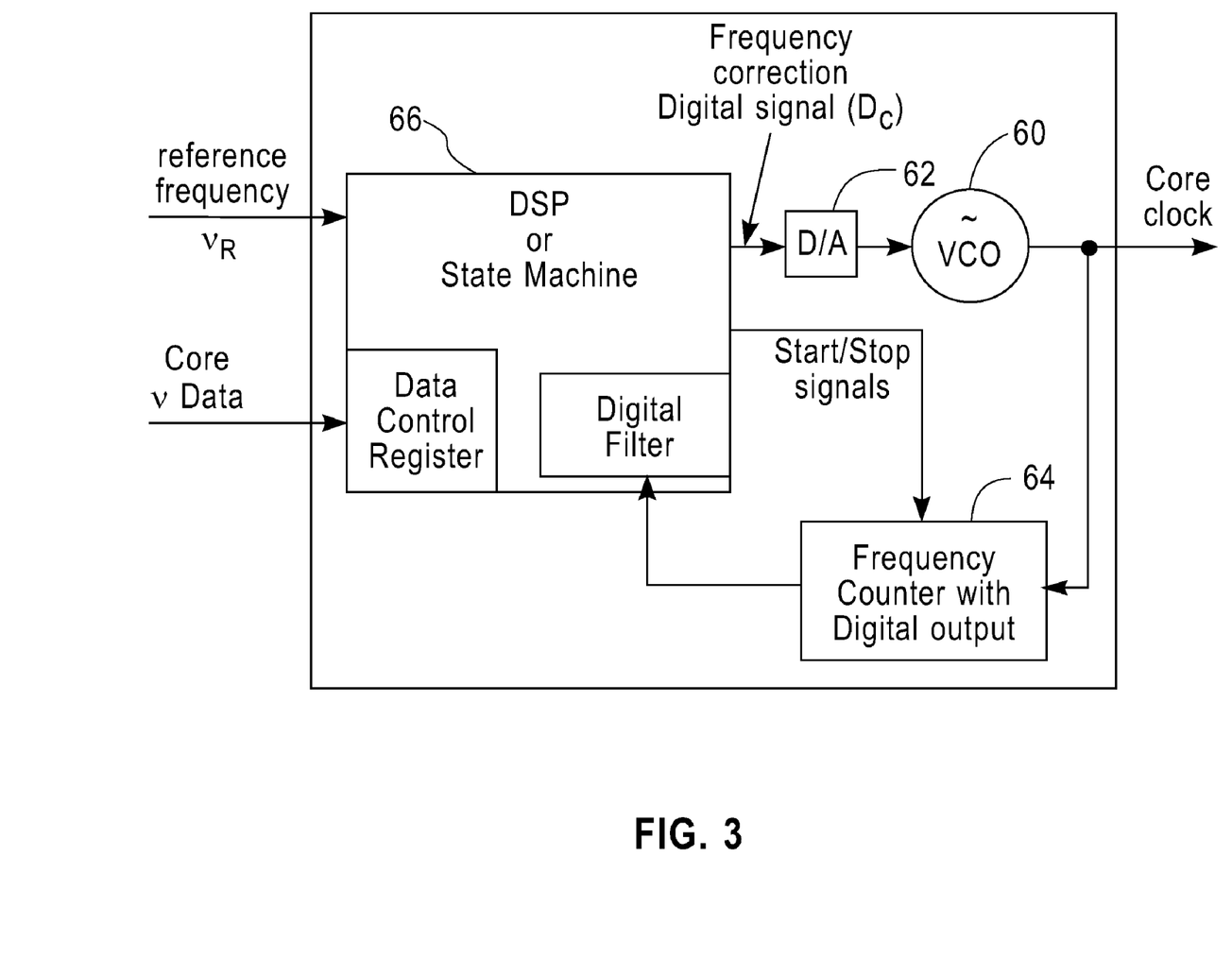
FIG. 3 illustrates the design of a digitally controlled clock generator.

The design of the digitally controlled clock generator is illustrated in FIG. 3. It is comprised of a voltage controlled high-speed oscillator (VCO) 60, a digital to analog converter (D/A) 62, a frequency counter 64 with digital output, and a digital signal processor ASP 66. The VCO output is the core processor clock and can be tuned to operate above and below the mean operating frequency of the total processor machine population. The operating range, center frequency, and voltage to frequency conversion characteristic are a function of the VCO design and technology. The VCO is tuned to a precise frequency (for example, plus or minus 100 MHz) by changing the analog control voltage up or down in precise increments (for example, in increments of 1100 MHz or integer multiple of 100 MHz) until the desired frequency is achieved.

A portion of the output of the VCO is sent to the frequency counter, which measures the number of cycles over a time interval. The time interval, which is governed by the reset/start and stop signals from the DSP, is based on the $n_R$ frequency. The "reset/start" signal resets the counter to zero and starts a new count. The "stop" signal stops the counter for reading and transmitting to the DSP. The counter has sufficient stages to enable a count consistent with the processor frequency and the frequency resolution required. A time interval of one second will generate a full count, which is equal to the frequency if all cycles are counted.

The time interval for measurement could be a full one-second-time interval but the appropriate low order bits only need be read and compared. The high order bits will not vary due to the VCO range limitation. Another approach is to use less than a full second because the VCO can operate over a relative narrow range (e.g. +/−20% or less from nominal) and compare the appropriate bits.

The digital count value from the counter is digitally filtered (averaged) in the DSP to remove any unwanted and random noise. It is then converted to the format of the n Data and compared to the value stored in the Data Control Register (see FIG. 3). If the values do not compare, a digital correction signal is sent to the D/A to adjust the VCO frequency appropriately. Adjustments will continue until the VCO frequency matches the value stored in the Data Control Register.

A spread spectrum approach can be used to improve the electromagnetic interference (EMI) immunity of the server. For example, the DSP could systematically add and subtract a predefined amount from the n Data value in the Data Control Register. This is done such that the mean value always remains the same as the base n Data value. The VCO frequency will oscillate about the mean frequency value. Another approach is to vary the reference oscillator about its' mean. This variation will change the time interval of the DSP thereby affecting the count and causing the VCO output to vary. Since each core is likely to be at a different frequency, any issues associated with EMI are likely to be mitigated and the frequency variation can be minimized.

Figure 4:
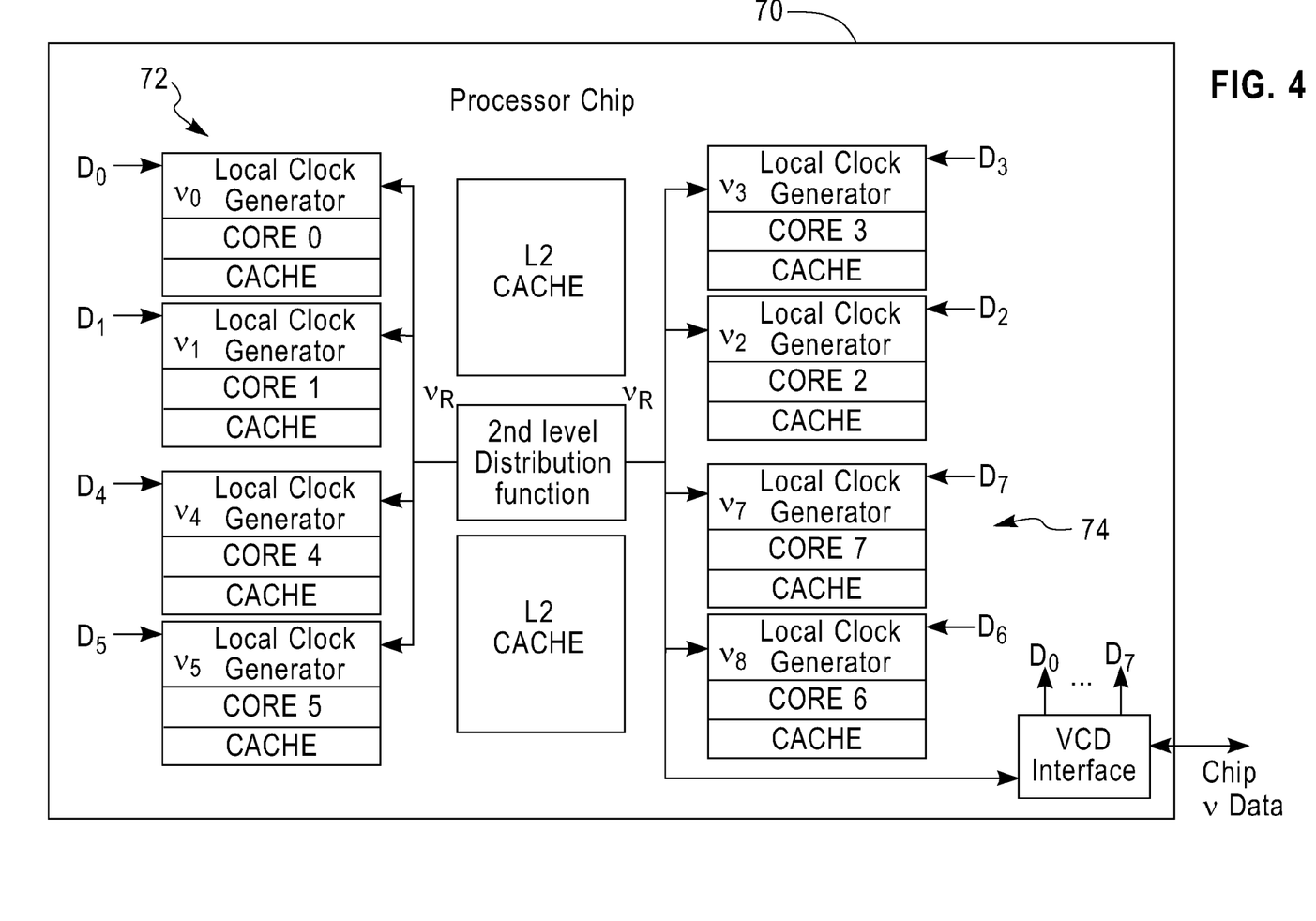
FIG. 4 shows an alternate processor chip configuration, where multi-core groups share an L2 cache.

FIG. 4 illustrates an alternate processor chip configuration 70 (versus FIG. 2) where multi-core groups 72, 74 share an L2 cache. The chip also contains the appropriate interfaces to the I/O, Memory, and Fabric controllers (not shown). The reference signal $v_R$ is applied to each core clock generator as well as to the VCD Interface function. The digital clocking attributes and functions discussed for FIG. 2 also apply to this configuration. The processor cores of FIG. 4 could operate at the same frequency or at different frequencies. This may be due to manufacturing differences between the cores on the chip. The arrangement of four cores sharing an L2 cache one chip, as shown in FIG. 4, is optimal for wiring resource: local processor/L1 cache clock grids, and $V_{dd}$ (power supply voltage) grids.

Figure 5:
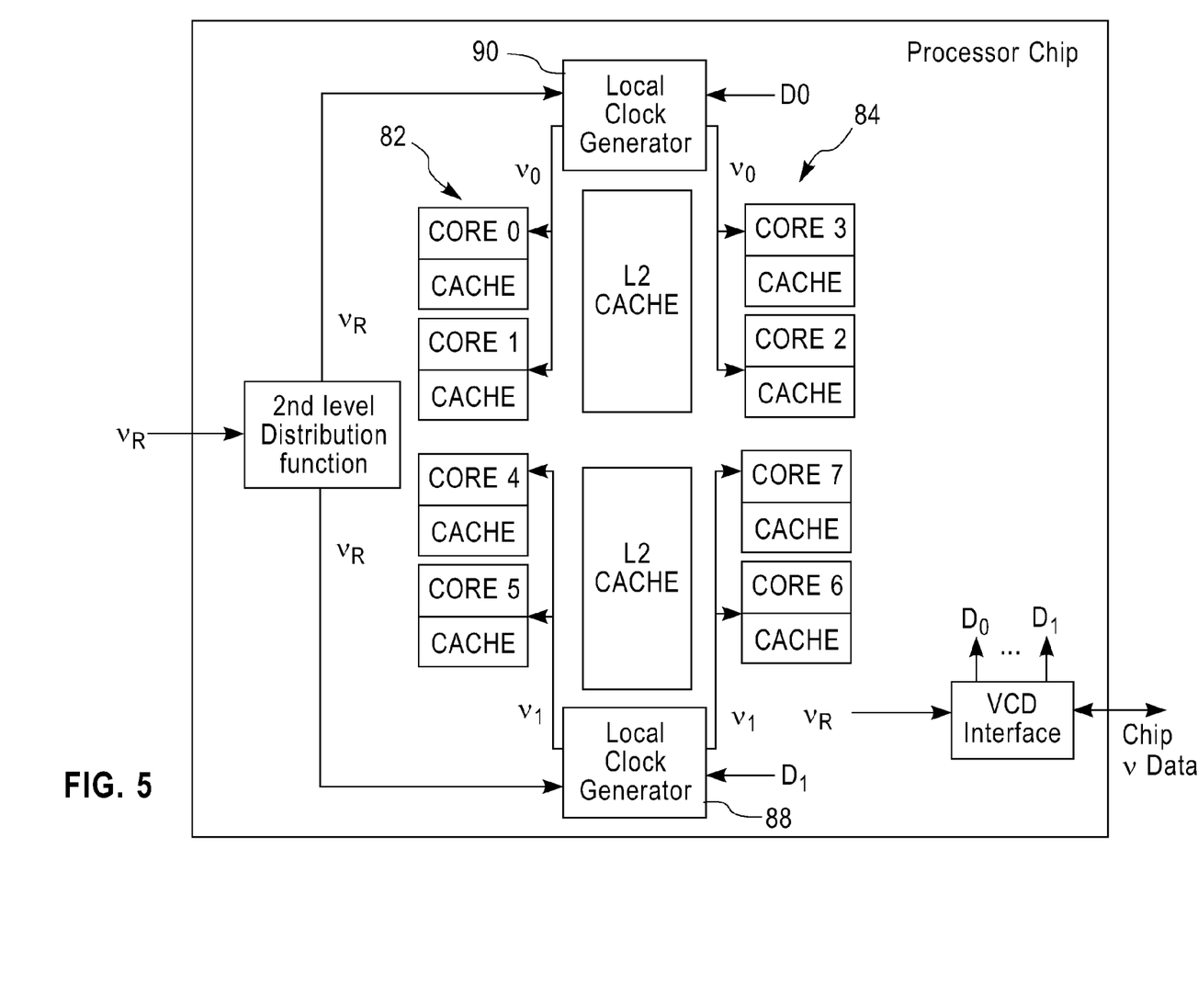
FIG. 5 illustrates another alternate processor chip configuration, where multi-core groups share an L2 cache and a common local clock generator.

FIG. 5 illustrates another alternate processor chip configuration 80 where multi-core groups 82, 84 share an L2 cache and a common local clock generator 88, 90. In this configuration, each core group of four contains one clock generator. The chip also contains the appropriate interfaces to the I/O, Memory, and Fabric controllers (not shown).

The digital clocking attributes and functions discussed for FIG. 2 also apply to this configuration. This configuration has a common local frequency for a region of cores and the local shared cache. This configuration may also have two multi-drop buses or a point-to-point star interconnection from the local clock generator to the local clock driver on each core.

The granularity of clocking That is, the size of the increments used to change the frequency of the clock signal by core or core groups depends on the nature of technology variability, size of cores, etc.

The present invention enables a level of scalability and flexibility that is not readily available with today's state-of-the art. For example, with the present invention, the optimum core operation frequency can be determined by varying the local frequency and $V_{dd}$ (power supply voltage), and the invention enables in-field calibration of optimal operating conditions (if processor circuits degrade with time or environmental operating conditions).

The instant invention also enables redundant clocks—that is, each local clock generator could have a "Bypass" mode to allow a generic system clock or another core's clock to be used in the event that the local clock generator circuit fails (or shows low yield in early mfg.). With this invention, clock information is in digital format (data) at relatively low speed.

Different types of caches may be used in this invention. For instance, the invention may be used with a core cache (L1) synchronous with the core, but with a separate $V_{dd}$ from the core. The invention may also be used with a cache that is asynchronously shared among a set of processors; shown herein as running at a system frequency (ns), but the cache could also have a local, independent clock generator.

With this invention, different cores/regions/cache can have different $V_{dd}$ and different frequencies, and local clock grid(s) can be driven by, for example, a local clock source or a global chip clock grid driven by a global chip clock. The present invention allows global spread-spectrum from the system reference oscillator; each local clock generator may track the system reference oscillator spreading to avoid the "out-of-phase spreading" problem. In addition, with this invention, digital spread spectrum techniques via the DSP may also be used.

Aspects of the present invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art and it is intended that the appended claims cover all such modifications and embodiments as fall within the true spirit and scope of the present invention.

What is claimed is:

1. A method of digital frequency clocking in a processor core, comprising the steps of:
   providing at least one-processor core, said at least one processor core having a clocking subsystem for generating an output clock signal at a variable frequency;
   loading onto said at least one processor core digital frequency control data, including a given frequency value, for the processor core; and
   said at least one processor core,
   i) receiving and storing the digital frequency control data, including said given frequency value, loaded onto said processor core, and
   ii) using said stored digital frequency control data, including said given frequency value, to set the frequency of the output clock signal of the clocking subsystem of the processor core; and wherein:
   the providing step includes the step of providing a plurality of processor cores, each of the processor cores having a respective clocking subsystem for generating an output clock signal at a variable frequency;
   the loading step includes the step of loading onto each of the processor cores, individual digital frequency control data for the respective processor core;
   the receiving step includes the step of, each of the processor cores receiving the digital frequency control data sent to said each processor core; and
   the using step includes the step of, each of the processor cores using the digital frequency control data received by said each processor core to set the frequency of the output clock signal of the clocking subsystem of said each processor core.

2. A method according to claim 1, wherein:
   each of the processor cores includes an oscillator to generate the output clock signal; and
   the using step includes the step of using said received digital frequency control data to control said oscillator to generate the output clock signal.

3. A method according to claim 2, wherein:
   the oscillator is a voltage controlled oscillator; and
   the step of using said received digital frequency control data includes the step of using said received digital frequency control data to control said voltage controlled oscillator to generate the output clock signal at the set frequency of the output clock signal.

4. A method according to claim 1, wherein the processor cores are on a processor chip, and the processor chip includes a chip data interface, and the loading step includes the steps of:
   sending to the chip data interface a multitude of sets of frequency control data for the processor cores on the chip, each of the sets of frequency control data being addressed to one of the processor cores on the chip; and
   using the chip data interface to distribute said sets of frequency control data to the processor cores on the chip.

5. A method of digital frequency clocking in a processor core, comprising the steps of:
   providing at least one-processor core, said at least one processor core having a clocking subsystem for generating an output clock signal at a variable frequency;
   loading onto said at least one processor core digital frequency control data, including a given frequency value, for the processor core; and
   said at least one processor core,
   i) receiving and storing the digital frequency control data, including said given frequency value, loaded onto said processor core, and
   ii) using said stored digital frequency control data, including said given frequency value, to set the frequency of the output clock signal of the clocking subsystem of the processor core; and wherein:
   multiple cores are asynchronously clocked and in which the core frequencies are independently set, and, there is no phase relationship between the processor core clocks.

6. A method of digital frequency clocking in a processor core, comprising the steps of:
   providing at least one-processor core having a clocking subsystem for generating an output clock signal at a variable frequency;
   loading onto said at least one processor core digital frequency control data for the processor core; and
   i) receiving the digital frequency control data loaded onto said processor core, and
   ii) using said received digital frequency control data to set the frequency of the output clock signal of the clocking subsystem of the processor core; wherein:
   the providing step includes the step of providing a plurality of processor cores, each of the processor cores having a respective clocking subsystem for generating an output clock signal at a variable frequency;
   the loading step includes the step of loading onto each of the processor cores, individual digital frequency control data for the respective processor core;
   the receiving step includes the step of, each of the processor cores receiving the digital frequency control data sent to said each processor core;

the using step includes the step of, each of the processor cores using the digital frequency control data received by said each processor core to set the frequency of the output clock signal of the clocking subsystem of said each processor core;

each of the processor cores further includes a digital signal processor; and the loading step includes the step of sending the digital frequency control data for each processor core to the digital signal processor of said core.

7. A method according to claim 6, wherein the digital frequency control data for each processor core includes:
   a digital representation of a given frequency for the clock signal of the processor core; and
   identification of the processor core and of the processor chip.

8. A method according to claim 7, wherein the step of using said received digital frequency control data to control said oscillator includes the further steps of:
   measuring the frequency of the output clock signal; and
   sending a digital representation of said measured frequency to the digital signal processor.

9. A system for digital frequency clocking in a processor core, comprising:
   at least one clocking subsystem on at least one processor core, and for generating an output clock signal at a variable frequency;
   a service element for loading onto said at least one processor core digital frequency control data, including a given frequency value, for the processor core; and
   said at least one processor core includes,
   i) a receiver for receiving and storing the digital frequency control data, including said given frequency value, loaded onto said core, and
   ii) means for using said stored digital frequency control data, including said given frequency value, to set the frequency of the output clock signal of the clocking subsystem of the processor core; and wherein:
   a plurality of clocking subsystems are provided, and each of a plurality of processor cores includes a respective one of the clocking subsystems for generating an output clock signal at a variable frequency;
   the service element loads onto each of the processor cores individual digital frequency control data for the processor core; and
   each of the processor core includes,
   i) a receiver for receiving the digital frequency control data loaded onto said each core, and
   ii) means for using said received digital frequency control data to set the frequency of the output clock signal of the clocking subsystem of said each processor core.

10. A system according to claim 9, wherein:
    each of the clocking subsystems includes a voltage controlled oscillator to generate the output clock signal; and
    the means for using said received digital frequency control data includes means for using said received digital frequency control data to control said voltage controlled oscillator to generate the output clock signal at the set frequency of the output clock signal.

11. A system according to claim 10, wherein:
    said means for using said received digital frequency control data includes a digital signal processor; and
    the digital frequency control data for each processor core is sent to the digital signal processor of said processor core.

12. A system according to claim 11, wherein the digital frequency control data for each processor core includes:
    a digital representation of a given frequency for the clock signal of the processor core; and
    identification of the processor core and of the processor chip.

13. A system according to claim 12, further comprising:
    a frequency counter for measuring the frequency of the output clock signal and for sending a digital representation of said measured frequency to the digital signal processor.

14. A system according to claim 9, wherein:
    the processor cores are on a processor chip, and the processor chip includes a chip data interface;
    the service element loads onto the chip data interface a multitude of sets of frequency control data for the processor cores on the chip, each of the sets of frequency control data being addressed to one of the processor cores on the chip; and
    the chip data interface distributes said sets of frequency control data to the processor cores on the chip.

15. A system according to claim 9, wherein the output clock signal generated by said at least one clocking subsystem is an analog signal.

16. A system for digital frequency clocking in a processor core, comprising:
    at least one clocking subsystem on at least one processor core, and for generating an output clock signal at a variable frequency;
    a service element for loading onto said at least one processor core digital frequency control data, including a given frequency value, for the processor core; and
    said at least one processor core includes,
    i) a receiver for receiving and storing the digital frequency control data, including said given frequency value, loaded onto said core, and
    ii) means for using said stored digital frequency control data, including said given frequency value, to set the frequency of the output clock signal of the clocking subsystem of the processor core; and wherein:
    multiple processor cores are asynchronously clocked and in which the processor core frequencies are independently set, and there is no phase relationship between the processor core clocks.

17. A program storage device readable by machine, tangibly embodying a program of instructions executable by the machine to perform method steps for digital frequency clocking in at least one processor core, said at least one processor core including a clocking subsystem for generating an output clock signal at a variable frequency, said method steps comprising:
    loading onto said at least one processor core digital frequency control data, including a given frequency value for the processor core; and
    said at least one processor core,
    i) receiving and storing the digital frequency control data, including said given frequency value, loaded onto said core, and
    ii) using said received digital frequency control data, including said given frequency value, to set the frequency of the output clock signal of the clocking subsystem of the processor core; and wherein:
    a plurality of processor cores are provided, each of the processor cores having a respective clocking subsystem for generating an analog output clock signal at a variable frequency,
    the loading step includes the step of loading onto each of the processor cores, individual digital frequency control data for the respective processor core;

the receiving step includes the step of, each of the processor cores receiving the digital frequency control data loaded onto said each processor core; and the using step includes the step of, each of the processor cores using the digital frequency control data received by said each processor core to set the frequency of the output clock signal of the clocking subsystem of said each processor core.

18. A program storage device according to claim 17, wherein:

each of the processor cores includes a voltage controlled oscillator to generate the output clock signal; and the using step includes the step of using said received digital frequency control data to control said voltage controlled oscillator to generate the output clock signal at the set frequency of the output clock signal.

19. A program storage device according to claim 18, wherein:

each of the processor cores further includes a digital signal processor; and the digital frequency control data for each processor core is sent to the digital signal processor of said processor core.

20. A program storage device according to claim 19, wherein the digital frequency control data for each processor core includes:

a digital representation of a given frequency for the clock signal of the processor core; and identification of the core and of the processor chip.

21. A program storage device according to claim 20, wherein the using step includes the step of:

measuring the frequency of the output clock signal; and sending a digital representation of said measured frequency to the digital signal processor.

22. A program storage device readable by machine, tangibly embodying a program of instructions executable by the machine to perform method steps for digital frequency clocking in at least one processor core, said at least one processor core including a clocking subsystem for generating an output clock signal at a variable frequency, said method steps comprising:

loading onto said at least one processor core digital frequency control data, including a given frequency value for the processor core; and said at least one processor core, i) receiving and storing the digital frequency control data, including said given frequency value, loaded onto said core, and ii) using said received digital frequency control data, including said given frequency value, to set the frequency of the output clock signal of the clocking subsystem of the processor core; and wherein:

multiple cores are asynchronously clocked and in which the core frequencies are independently set, and there is no phase relationship between the processor core clocks.

* * * * *